United States Patent
Nakagawa

(10) Patent No.: US 10,788,718 B2
(45) Date of Patent: Sep. 29, 2020

(54) LIQUID CRYSTAL DISPLAY DEVICE

(71) Applicant: Panasonic Liquid Crystal Display Co., Ltd., Hyogo (JP)

(72) Inventor: Teruhisa Nakagawa, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/202,964

(22) Filed: Nov. 28, 2018

(65) Prior Publication Data

US 2020/0166790 A1  May 28, 2020

(51) Int. Cl.
| | |
|---|---|
| *G02F 1/1339* | (2006.01) |
| *G09G 3/36* | (2006.01) |
| *G02F 1/1333* | (2006.01) |
| *G02F 1/1362* | (2006.01) |
| *G02F 1/1335* | (2006.01) |
| *G02F 1/1343* | (2006.01) |

(52) U.S. Cl.
CPC .... *G02F 1/13392* (2013.01); *G02F 1/133345* (2013.01); *G02F 1/133514* (2013.01); *G02F 1/134309* (2013.01); *G02F 1/136286* (2013.01); *G09G 3/3648* (2013.01); *G02F 2201/121* (2013.01); *G02F 2201/123* (2013.01)

(58) Field of Classification Search
CPC ........... G02F 1/13392; G02F 1/133345; G02F 1/133514; G02F 1/134309; G02F 1/136286; G02F 2201/121; G02F 2201/123; G09G 3/3648
USPC ........................................................ 345/87
See application file for complete search history.

(56) References Cited

U.S. PATENT DOCUMENTS

2016/0180781 A1* 6/2016 Kim ...................... G06F 3/0416
345/212
2017/0102575 A1* 4/2017 Yasukawa ......... G02F 1/133345

* cited by examiner

*Primary Examiner* — Chanh D Nguyen
*Assistant Examiner* — Ngan T. Pham-Lu
(74) *Attorney, Agent, or Firm* — Hamre, Schumann, Mueller & Larson, P.C.

(57) ABSTRACT

A display device includes a first substrate and a second substrate facing the first substrate. A plurality of spacers is disposed between the first and second substrates. The first substrate includes a plurality of gate lines extending in a row direction, a plurality of data lines extending in a column direction, and a plurality of pixel electrodes. A first insulator covers the plurality of gate lines. A semiconductor layer is formed on the first insulator. A common electrode is formed on the second insulator and faces the plurality of pixel electrodes. A plurality of common lines extend along the plurality of data lines and supply common voltage to the common electrode. A plurality of seat regions are formed in which at least one of the plurality of gate lines, the semiconductor layer, and one of the plurality of data lines overlap to face the plurality of spacers.

18 Claims, 5 Drawing Sheets

LIQUID CRYSTAL DISPLAY DEVICE

FIELD

This disclosure relates generally to an electronic display device. More specifically, the disclosure relates to an electronic display device such as, but not limited to, a liquid crystal display device.

BACKGROUND

A liquid crystal display (LCD) device is an electronic display that is widely used as a display for electronic devices such as, but not limited to, computers, televisions, cellular phones, and the like. An LCD device generally includes a thin film transistor (TFT) substrate and a color filter (CF) substrate. A liquid crystal layer is disposed between the TFT substrate and the CF substrate.

SUMMARY

This disclosure relates generally to an electronic display device. More specifically, the disclosure relates to an electronic display device such as, but not limited to, a liquid crystal display device.

In an embodiment, an electronic display device is a liquid crystal display device.

In an embodiment, the liquid crystal display device is an in-plane switching (IPS) mode liquid crystal display device.

In an embodiment, the electronic display device can be included as a display for an electronic device such as, but not limited to, a display for a laptop computer.

A display device is disclosed. The display device includes a first substrate and a second substrate facing the first substrate. A plurality of spacers is disposed between the first substrate and the second substrate. The first substrate includes a plurality of gate lines extending in a row direction, a plurality of data lines extending in a column direction, and a plurality of pixel electrodes. A first insulator covers the plurality of gate lines. A semiconductor layer is formed on the first insulator. The plurality of data lines is formed on the semiconductor layer. A second insulator covers the plurality of data lines. The plurality of pixel electrodes includes a plurality of first pixel electrodes corresponding to a first color, a plurality of second pixel electrodes corresponding to a second color, and a plurality of third pixel electrodes corresponding to a third color. A common electrode is formed on the second insulator and faces the plurality of pixel electrodes. A plurality of common lines extend along the plurality of data lines and are configured to supply common voltage to the common electrode. A plurality of seat regions are formed in which at least one of the plurality of gate lines, the semiconductor layer, and one of the plurality of data lines overlap to face the plurality of spacers are provided in the first substrate. A plurality of boundary areas includes a plurality of first boundary areas on which respective common lines are disposed and a plurality of second boundary areas on which the plurality of common lines are not disposed. The plurality of first boundary areas and the plurality of second boundary areas are disposed between the plurality of third pixel electrodes and the plurality of first pixel electrodes and extend in the column direction. In the plurality of second boundary areas, one of the plurality of spacers faces the one of the plurality of seat regions.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

This disclosure relates generally to an electronic display device. More specifically, the disclosure relates to an electronic display device such as, but not limited to, a liquid crystal display device.

A liquid crystal display device generally includes a thin film transistor (TFT) substrate and a color filter (CF) substrate. A liquid crystal layer is disposed between the TFT substrate and the CF substrate. The CF substrate includes a plurality of colored regions (e.g., a red portion, a green portion, and a blue portion) and one or more light blocking layers (e.g., a black matrix). The one or more light blocking layers may be arranged in a boundary region between the plurality of colored regions. This arrangement can have a color mixing problem that occurs when light (e.g., from a backlight of the liquid crystal display device) leaks between adjacent pixel regions of the liquid crystal display device. The color mixing may be most evident when viewing the liquid crystal display device from an angle (e.g., an oblique angle).

In the liquid crystal display device, a plurality of spacers hold a distance (gap) between the first substrate and the second substrate. The gap may alternatively be referred to as a cell gap or the like. A seat region is formed in a first substrate. A spacer is formed in a second substrate. The first substrate and the second substrate adhere to each other such that the seat region and the spacer contact with each other, thereby holding the gap. Desirably, the spacer is disposed at a position where a numerical aperture of the pixel is not degraded.

A liquid crystal display device includes a plurality of common wires connected to a common electrode. The common wires supply a common voltage to the common electrode from the common power source. In general, the common line cannot include the seat region for a spacer as the height of the seat region on the common line would be greater than a height of other seat regions. To maintain the gap, a number of spacers and seat regions can be increased.

Embodiments described in this Specification modify a location of the common lines to enable increasing a number of spacers and seat regions despite being limited to including the spacers and seat regions at locations other than the common lines. This can be accomplished by, for example, reducing a number of common lines in the display device.

Figure 1:
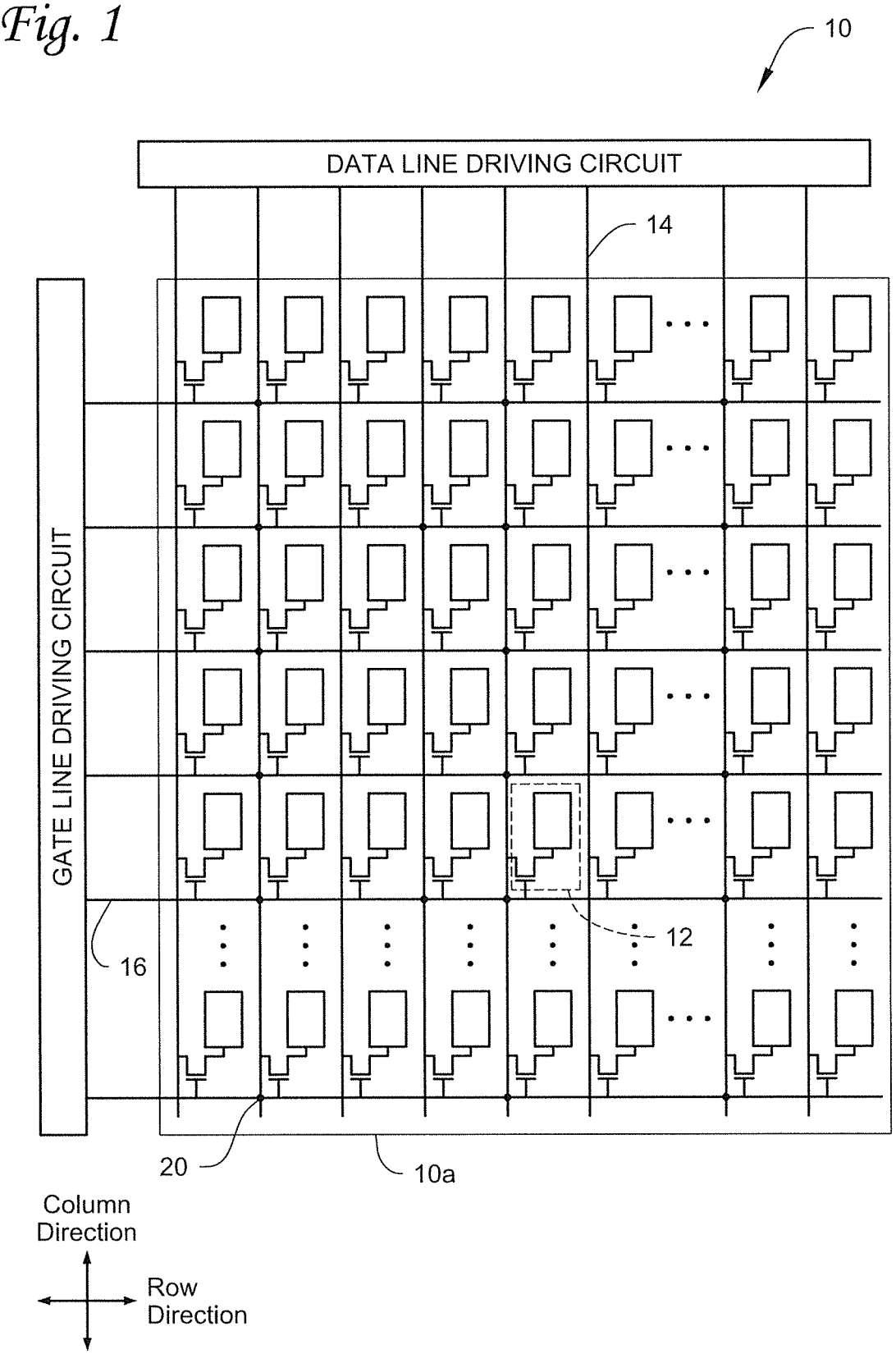
FIG. 1 illustrates a schematic diagram of a liquid crystal display device, according to an embodiment.

FIG. 1 illustrates a schematic diagram of a liquid crystal display device, according to an embodiment. The liquid crystal display device includes display panel 10 that displays an image, a driving circuit (data line driving circuit, gate line driving circuit) that drives display panel 10, a control circuit (not illustrated) that controls the driving circuit, and a backlight (not illustrated) that irradiates display panel 10 with light from a rear surface side.

In display region 10a of display panel 10, pixels 12 (each of which is surrounded by two adjacent data lines 14 and two adjacent gate lines 16) are arrayed into a matrix shape in row and column directions. It is assumed that the column direction is a direction in which data line 14 extends, and that the row direction is a direction in which the gate line 16 extends.

A spacer 20 (shown and described in additional detail below) is also shown in FIG. 1.

Figure 2:
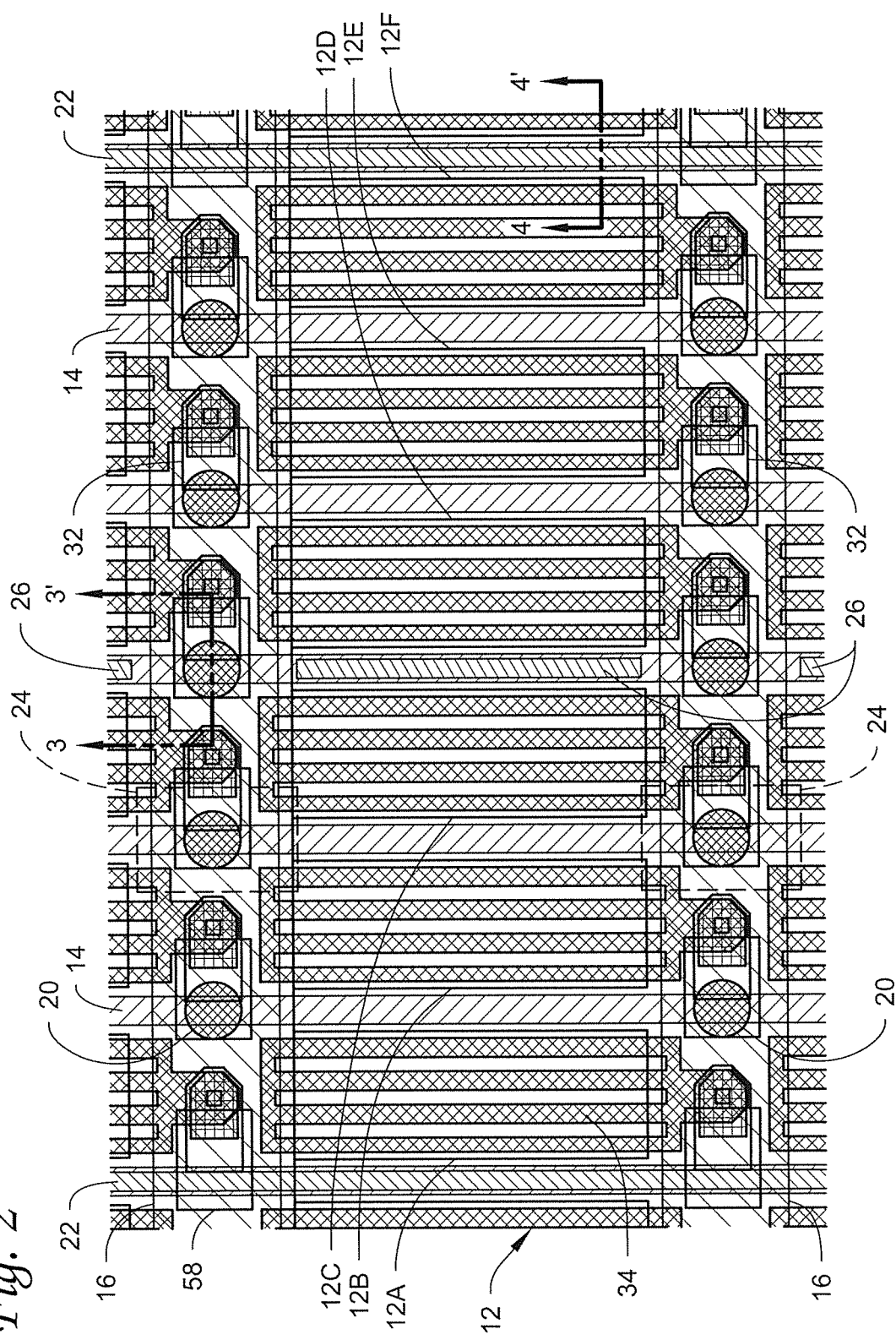
FIG. 2 is a plan view illustrating a configuration of pixels, according to an embodiment.
Figure 3:
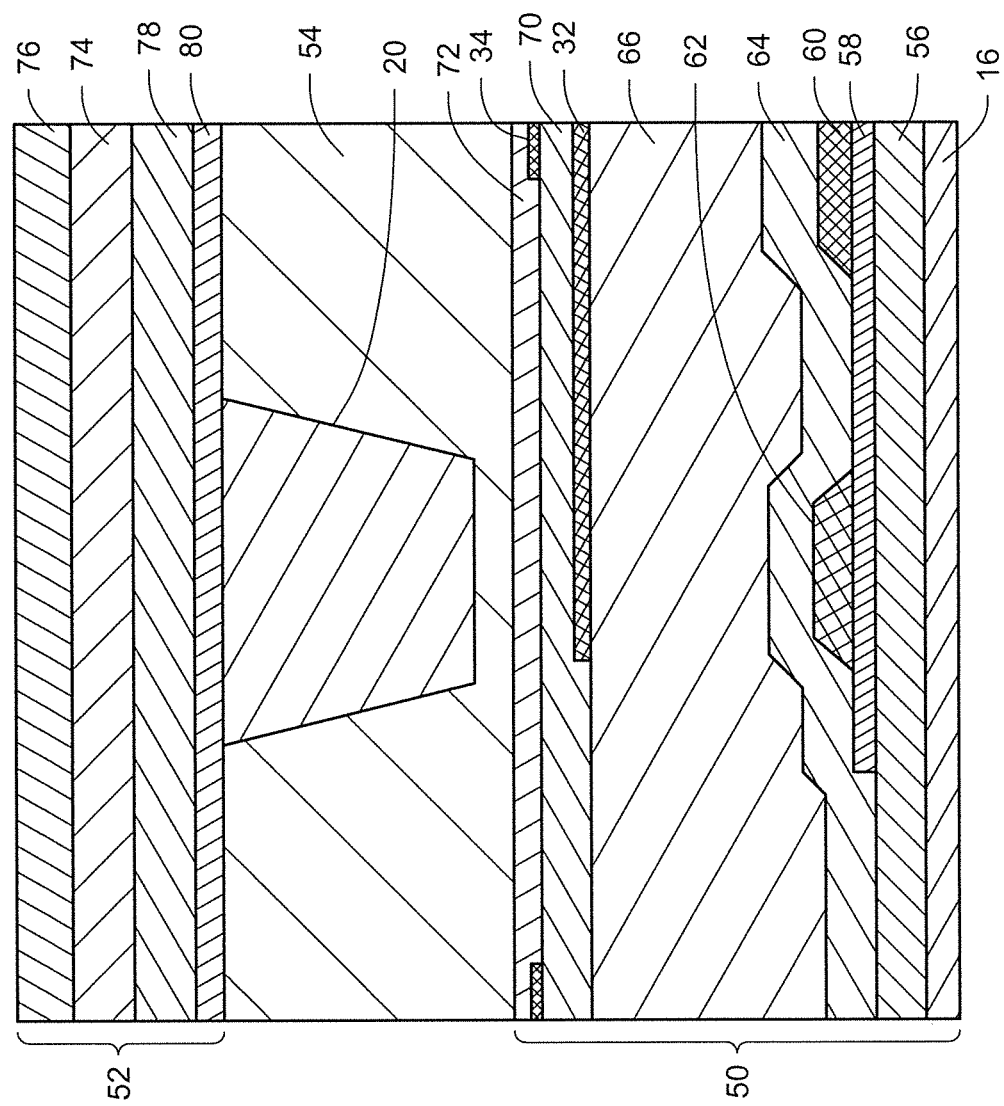
FIG. 3 is a sectional view taken along line 3-3' at a first location of FIG. 2, according to an embodiment.
Figure 4:
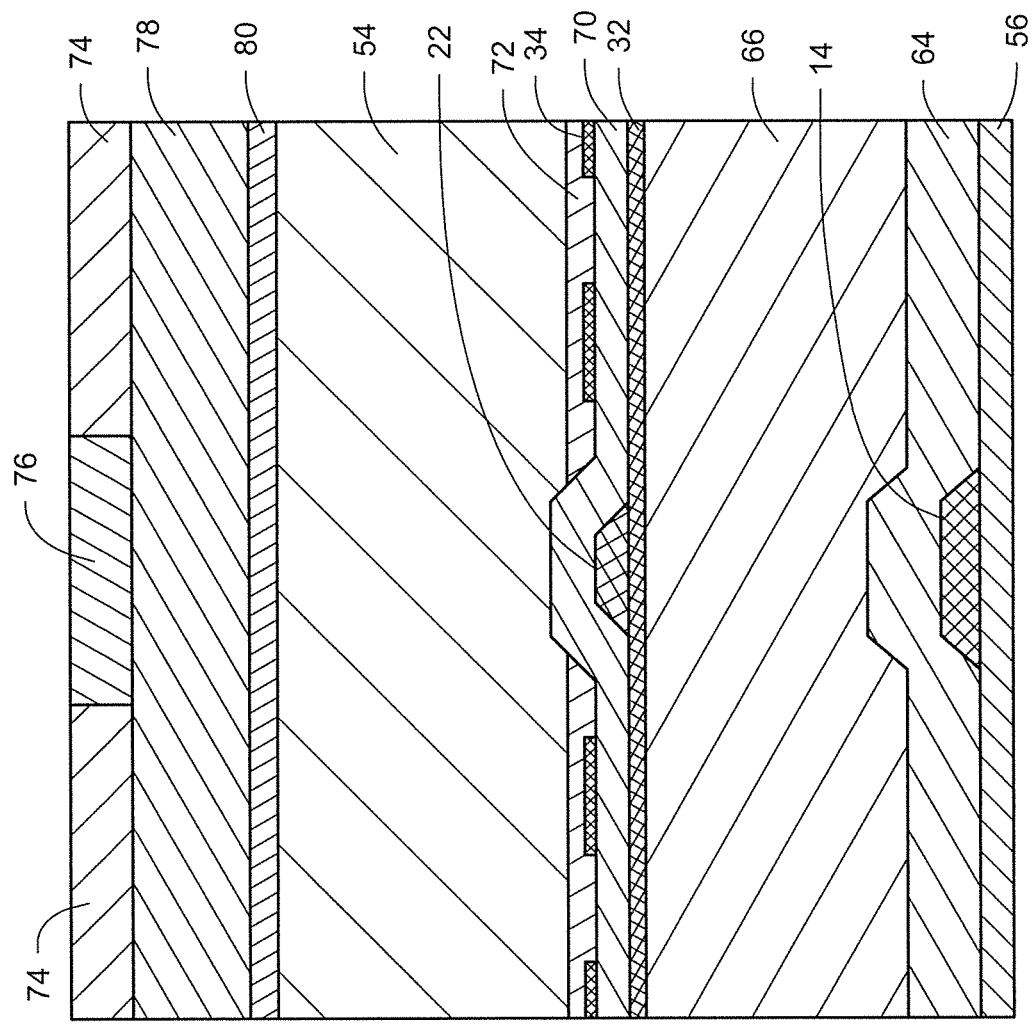
FIG. 4 is a sectional view taken along line 4-4' at a second location of FIG. 2, according to an embodiment.

FIG. 2 is a plan view illustrating a configuration of pixels 12, according to an embodiment. FIG. 3 is a sectional view taken along line 3-3' at a first location of FIG. 2. FIG. 4 is a sectional view taken along line 4-4' at a second location of FIG. 2.

FIG. 2 includes a region delineated by two adjacent data lines 14 and two adjacent gate lines 16 to define a single pixel 12.

In the illustrated embodiment, six pixels 12A-12F are shown. It will be appreciated that the pixels 12 are representative. From left-to-right in the illustrated embodiment, pixel 12A is representative of a red pixel, pixel 12B is representative of a green pixel, pixel 12C is representative of a blue pixel, pixel 12D is representative of a red pixel, pixel 12E is representative of a green pixel, and pixel 12F is representative of a blue pixel.

In FIG. 2, a plurality of common lines 22 are shown. In the illustrated embodiment, two common lines 22 are shown. The common lines 22 are placed every six columns. That is, the first common line 22 is shown bordering the pixel 12A and the second common line 22 is shown bordering the pixel 12F. In a prior art embodiment, a common line 22 is repeated every three columns and would accordingly be included between pixels 12C and 12D.

The illustrated embodiment is defined as having a pitch of the common lines 22 equal to six columns. In an embodiment, the pitch can be greater than six (e.g., nine, etc.) columns. It will be appreciated that the pitch is a multiple of three since there is a pattern of repeating pixels 12 every three pixels (e.g., red, green, blue). As a result, in the illustrated embodiment, a common line 22 is disposed at every other border between a blue pixel and a red pixel when the pitch is six columns.

A plurality of spacers 20 and seat regions 24 are disposed at every column (e.g., along data lines 14) that does not include common line 22.

In the illustrated embodiment, a dummy line 26 is disposed in a location between pixel 12C and pixel 12D. The dummy line 26 is disposed at the location from which common line 22 was omitted. The dummy line 26 can be discontinuous such that the dummy line 26 does not overlap the plurality of spacers 20 and the seat regions 24.

Each of the dummy lines 26 is physically isolated from each other. The dummy lines 26 are electrically connected to each other via the common electrode, which is disposed underneath the common lines 22 and the dummy lines 26 and electrically connected to the dummy lines 26 and the common lines 22. In an embodiment, electrically connecting the dummy lines 26 to the common electrode can stabilize an electric potential of the dummy lines 26. Stabilizing the electric potential of the dummy lines 26 can help maintain a steady voltage in the dummy lines 26, which can in turn reduce an amount of noise in an image displayed by the display device. Unlike the common lines 22, the dummy lines 26 are not connected to the common power source, according to an embodiment.

A semiconductor layer 58 and a common electrode 32 are disposed at each pixel 12.

Pixel electrodes 34 including a transparent conductive film such as Indium Tin Oxide (ITO) are formed in each pixel 12. Pixel electrodes 34 include a plurality of openings (slit), and is formed into a stripe shape. The shape and number of the openings is not intended to be limited.

FIG. 3 shows a sectional view taken along line 3-3' at a location of the seat region 24 in which spacer 20 is disposed, according to an embodiment. The display panel 10 includes a thin film transistor (TFT) substrate 50 (first substrate) disposed on a rear surface side (of the display), a color filter (CF) substrate 52 (second substrate) disposed on a display surface side, and a liquid crystal layer 54 sandwiched between the TFT substrate 50 and the CF substrate 52.

The TFT substrate 50 includes gate line 16 formed on a glass substrate. A first insulator 56 is formed so as to cover gate line 16. A step reflecting a planar shape or a thickness of gate line 16 is generated in a surface of first insulator 56. The first insulator 56 can be formed by silicon nitride (SiN) or the like. Gate line 16 can be formed by a metallic material mainly containing aluminum (Al), molybdenum (Mo), titanium (Ti), or copper (Cu), a plurality of laminated layers thereof, an alloy in which tungsten (W), manganese (Mn), or titanium (Ti) is added to the metallic material, or a laminated metallic layer of a combination thereof.

Semiconductor layer 58 is formed on first insulator 56. Drain electrode 60 and source electrode 62 are formed on semiconductor layer 58. The source electrode 62 is integral with the data line 14. A second insulator 64 is formed so as to cover drain electrode 60 and source electrode 62. An organic insulator 66 is formed on the second insulator 64. A step reflecting planar shapes or a thickness of semiconductor layer 58, drain electrode 60, and source electrode 62 is generated in the surface of second insulator 64. A gently curved inclination influenced by the step generated in the surface of second insulator 64 occurs in the surface of organic insulator 66. Second insulator 64 can be made of silicon nitride (SiN) or silicon dioxide (SiO2). Organic insulator 66 is made of a photosensitive organic material mainly containing acryl.

Common electrode 32 is formed on organic insulator 66. A third insulator 70 is formed so as to cover common electrode 32. The surface of common electrode 32 is formed while reflecting a surface shape of organic insulator 66. The surface of third insulator 70 is formed while reflecting the surface shape or thicknesses of common electrode 32 and organic insulator 70. The third insulator 70 can be formed by silicon nitride (SiN) or the like.

Pixel electrode 34 is formed on third insulator 70. An alignment film 72 is formed so as to cover pixel electrode 34. Pixel electrode 34 is electrically connected to a drain electrode 60 through a contact hole made in second insulator 64, organic insulator 66, and third insulator 70. Alignment film 72 may be an alignment film subjected to a rubbing alignment process or a light alignment film subjected to a light alignment process.

Although not illustrated, a polarizing plate and the like are formed on TFT substrate 50.

The CF substrate 52 includes a color filter 74 (e.g., a red color filter, a green color filter, and a blue color filter) and black matrix 76 formed on a glass substrate. An overcoat layer 78 is formed to cover the color filter 74. In an embodiment, the black matrix 76 is a resin material, a metallic material, or the like, in which black pigment is used. The overcoat layer 78 is an organic material.

An alignment film 80 is formed on overcoat layer 78. Alignment film 80 may be an alignment film subjected to the rubbing alignment process or a light alignment film subjected to the light alignment process.

It will be appreciated that one or more additional components can be formed on the CF substrate 52. For example, a polarizing plate or the like can be formed on the CF substrate 52.

Liquid crystal is sealed in liquid crystal layer 54. Liquid crystal may be a negative liquid crystal having a negative dielectric anisotropy or a positive liquid crystal having a positive dielectric anisotropy.

The laminated structure of each part constituting pixel 12 is not limited to the structure in FIG. 3, but a known structure can be applied.

The liquid crystal display device can have an in-plane switching (IPS)-system configuration. The configuration of the liquid crystal display device is not limited to the IPS-system configuration.

The laminated structure of each part constituting pixel 12 is not limited to the structure in FIG. 3, but a known structure can be applied. As described above, the liquid crystal display device has the IPS-system configuration. The configuration of the liquid crystal display device is not limited to the IPS-system configuration.

FIG. 4 is a sectional view taken along line 4-4' at a second location of FIG. 2, according to an embodiment. Unlike the sectional view in FIG. 3, because the section along line 4-4' is taken along a common line 22, the sectional view shows common line 22 formed on the common electrode 32 and covered by the third insulator 70.

Figure 5:
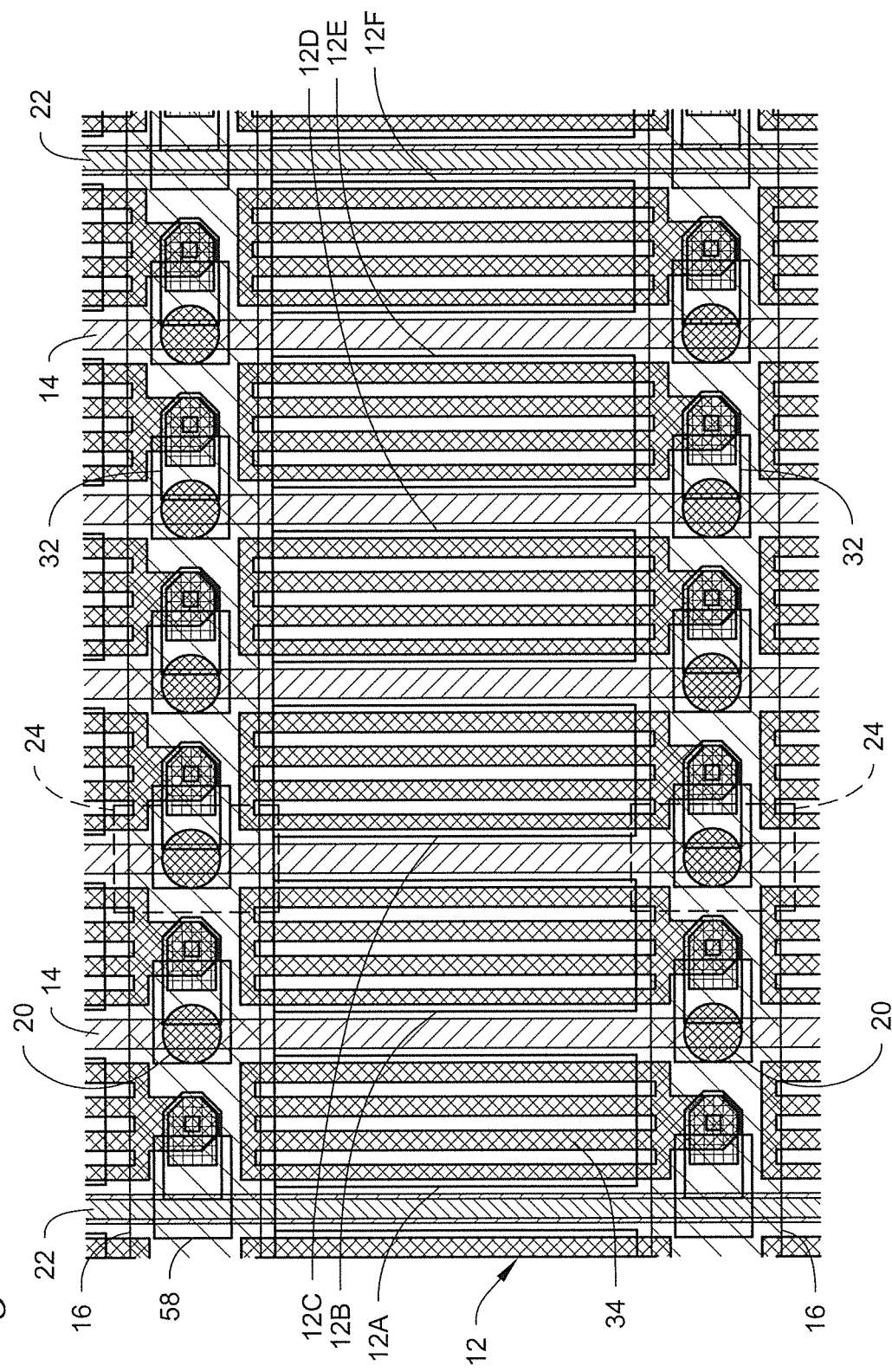
FIG. 5 is a plan view illustrating a configuration of pixels, according to another embodiment.

FIG. 5 is a plan view illustrating a configuration of pixels 12, according to another embodiment. The embodiment in FIG. 5 is substantially the same as the embodiment shown and described above in accordance with FIG. 2. Like parts are represented by like numbers and will not be described in further detail.

The embodiment in FIG. 5 differs from the embodiment in FIG. 2 by leaving out the dummy lines 26. Accordingly, at an interval between pixel 12C and pixel 12D, no dummy line 26 is shown in FIG. 5. In an embodiment, the dummy lines 26 can assist with maintaining a consistent image on the display device when viewed at an oblique viewing angle. Accordingly, the embodiment in FIG. 2 may have a more consistent image when viewed at an oblique viewing angle than the embodiment in FIG. 5.

Aspects:

Aspect 1. A display device, comprising: a first substrate; a second substrate facing the first substrate; and a plurality of spacers disposed between the first substrate and the second substrate, the first substrate including: a plurality of gate lines extending in a row direction, a plurality of data lines extending in a column direction, and a plurality of pixel electrodes; a first insulator covering the plurality of gate lines; a semiconductor layer formed on the first insulator; the plurality of data lines formed on the semiconductor layer; a second insulator covering the plurality of data lines; the plurality of pixel electrodes including a plurality of first pixel electrodes corresponding to a first color, a plurality of second pixel electrodes corresponding to a second color, and a plurality of third pixel electrodes corresponding to a third color; a common electrode formed on the second insulator and facing the plurality of pixel electrodes; and a plurality of common lines extending along the plurality of data lines and configured to supply common voltage to the common electrode, wherein a plurality of seat regions in which at least one of the plurality of gate lines, the semiconductor layer, and one of the plurality of data lines overlap to face the plurality of spacers are provided in the first substrate, a plurality of boundary areas include a plurality of first boundary areas on which respective common lines are disposed and a plurality of second boundary areas on which the plurality of common lines are not disposed, the plurality of first boundary areas and the plurality of second boundary areas are disposed between the plurality of third pixel electrodes and the plurality of first pixel electrodes and extend in the column direction, and in the plurality of second boundary areas, one of the plurality of spacers faces one of the plurality of seat regions.

Aspect 2. The display device of aspect 1, wherein the plurality of boundary areas include a plurality of third boundary areas disposed between the plurality of first pixel electrodes and the plurality of second pixel electrodes and extending in the column direction, and a plurality of fourth boundary areas disposed between the plurality of second pixel electrodes and the plurality of third pixel electrodes and extending in the column direction, wherein one or more spacers of the plurality of spacers are disposed in the plurality of third boundary areas, and one or more spacers of the plurality of spacers are disposed in the plurality of fourth boundary areas, in the plurality of third boundary areas, the one or more spacers of the plurality of spacers face respective seat regions, and in the plurality of fourth boundary areas, the one or more spacers of the plurality of spacers face respective seat regions.

Aspect 3. The display device of one of aspects 1 or 2, wherein the first substrate further includes an organic insulator formed on the second insulator, the common electrode formed on the organic insulator, and the plurality of common lines formed on the common electrode.

Aspect 4. The display device of one of aspects 1-3, wherein the first substrate further includes a third insulator formed to cover the common electrode and the plurality of common lines, and the plurality of pixel electrodes are formed on the third insulator.

Aspect 5. The display device of aspects 1-4, wherein in the plurality of second boundary areas, dummy lines are formed between two seat regions of the plurality of seat regions neighboring in the column direction, and the dummy lines are formed in a same layer as the plurality of common lines.

Aspect 6. The display device of aspect 5, wherein the dummy lines are formed on the common electrode and are electrically connected to the common electrode.

Aspect 7. The display device of aspect 5, wherein the dummy lines are physically isolated from each other.

Aspect 8. The display device of aspect 5, wherein the plurality of common lines are electrically connected to a common power source, the common power source configured to provide the common voltage to the common electrode via the plurality of common lines.

Aspect 9. The display device of aspect 8, wherein the common voltage is configured to be provided from the common power source to the dummy lines.

Aspect 10. The display device of any of aspects 1-9, wherein the display device is a liquid crystal display device.

Aspect 11. The display device of one of aspects 1-10, wherein the plurality of spacers are configured to maintain a clearance between the first substrate and the second substrate.

Aspect 12. The display device of one of aspects 1-11, wherein the plurality of spacers are disposed on the plurality of data lines.

Aspect 13. The display device of one of aspects 1-12, wherein the first substrate is a thin film transistor substrate and the second substrate is a color filter substrate.

Aspect 14. The display device of one of aspects 1-13, wherein the semiconductor layer includes a plurality of semiconductor films.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:
1. A display device, comprising:
   a first substrate;
   a second substrate facing the first substrate; and
   a plurality of spacers disposed between the first substrate and the second substrate,
   the first substrate including:
      a plurality of gate lines extending in a row direction, a plurality of data lines extending in a column direction, and a plurality of pixel electrodes;
      a first insulator covering the plurality of gate lines;
      a semiconductor layer formed on the first insulator;
      the plurality of data lines formed on the semiconductor layer;
      a second insulator covering the plurality of data lines;
      a common electrode formed on the second insulator and facing the plurality of pixel electrodes; and
      a plurality of common lines extending along the plurality of data lines and configured to supply common voltage to the common electrode,
   wherein a first seat region in which a first gate line among the plurality of gate lines, the semiconductor layer, and a first data line among the plurality of data lines overlap to face a first spacer among the plurality of spacers is provided in the first substrate,
   a second seat region in which a second gate line among the plurality of gate lines that is adjacent to the second gate line, the semiconductor layer, and the first data line overlap to face a second spacer among the plurality of spacers is provided in the first substrate, and
   a dummy line is formed between the first seat region and the second seat region, and does not overlap with both of the first seat region and the second seat region in plane view.
2. The display device of claim 1, wherein the first substrate further includes an organic insulator formed on the second insulator, the common electrode formed on the organic insulator, and the plurality of common lines formed on the common electrode.
3. The display device of claim 1, wherein the first substrate further includes a third insulator formed to cover the common electrode and the plurality of common lines, and the plurality of pixel electrodes are formed on the third insulator.
4. The display device of claim 1, wherein the dummy line is formed in a same layer as the plurality of common lines.
5. The display device of claim 4, wherein the dummy line is formed on the common electrode and is electrically connected to the common electrode.
6. The display device of claim 4, wherein the dummy line is physically isolated from other dummy lines.
7. The display device of claim 4, wherein the plurality of common lines are electrically connected to a common power source, the common power source configured to provide the common voltage to the common electrode via the plurality of common lines.
8. The display device of claim 7, wherein the common voltage is configured to be provided from the common power source to the dummy line via the common electrode.
9. The display device of claim 1, wherein the display device is a liquid crystal display device.
10. The display device of claim 1, wherein the plurality of spacers are configured to maintain a clearance between the first substrate and the second substrate.
11. The display device of claim 1, wherein the plurality of spacers are disposed on the plurality of data lines.
12. The display device of claim 1, wherein the first substrate is a thin film transistor substrate and the second substrate is a color filter substrate.
13. The display device of claim 1, wherein the semiconductor layer includes a plurality of semiconductor films.
14. The display device of claim 1, wherein:
   the plurality of pixel electrodes include:
      a plurality of first pixel electrodes corresponding to a first color,
      a plurality of second pixel electrodes corresponding to a second color, and
      a plurality of third pixel electrodes corresponding to a third color,
   a plurality of boundary areas include a plurality of first boundary areas on which respective common lines are disposed and a plurality of second boundary areas on which the plurality of common lines are not disposed,
   the plurality of first boundary areas and the plurality of second boundary areas are disposed between the plurality of third pixel electrodes and the plurality of first pixel electrodes and extend in the column direction, and
   the first seat region and the second seat region are provided in one of the plurality of second boundary areas.
15. The display device of claim 14, wherein the plurality of boundary areas include a plurality of third boundary areas disposed between the plurality of first pixel electrodes and the plurality of second pixel electrodes and extending in the column direction, and a plurality of fourth boundary areas disposed between the plurality of second pixel electrodes and the plurality of third pixel electrodes and extending in the column direction,
   wherein one or more spacers of the plurality of spacers are disposed in the plurality of third boundary areas, and one or more spacers of the plurality of spacers are disposed in the plurality of fourth boundary areas.
16. The display device of claim 1, wherein the plurality of common lines are not in the first seat region and the second seat region.
17. The display device of claim 1, wherein the second spacer is immediately adjacent to the first spacer in the column direction, and the second gate line is immediately adjacent to the first gate line in the column direction.

18. The display device of claim 1, wherein the dummy line is physically isolated from the plurality of common lines, but is electrically connected to the plurality of common lines via the common electrode.

\* \* \* \* \*